No. 664,428. Patented Dec. 25, 1900.
A. G. W. PETERSON & J. F. HASLAM.
LAWN SPRINKLER.
(Application filed Aug. 1, 1900.)
(No Model.)
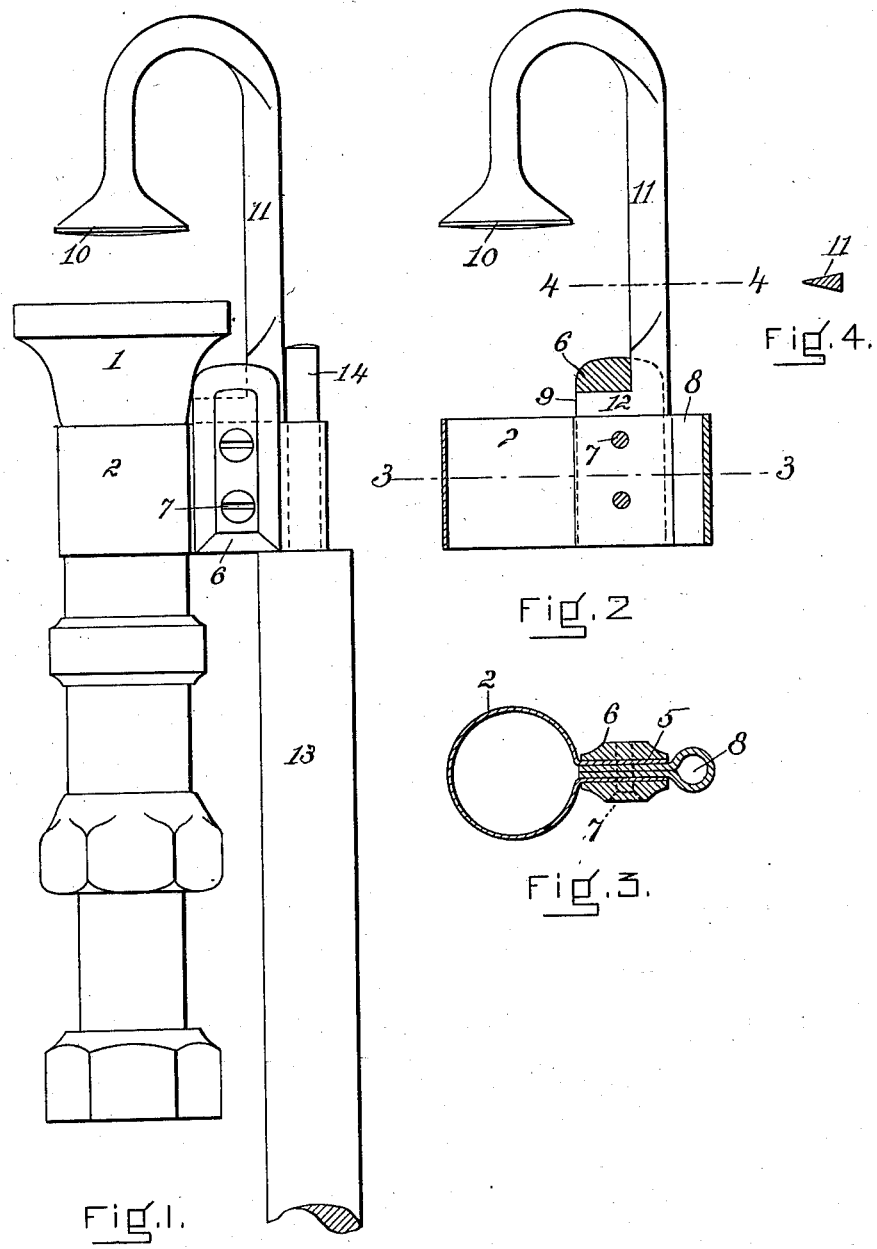

UNITED STATES PATENT OFFICE.

AUGUSTUS G. W. PETERSON AND JOHN F. HASLAM, OF BROCKTON, MASSACHUSETTS.

LAWN-SPRINKLER.

SPECIFICATION forming part of Letters Patent No. 664,428, dated December 25, 1900.

Application filed August 1, 1900. Serial No. 25,514. (No model.)

*To all whom it may concern:*

Be it known that we, AUGUSTUS G. W. PETERSON and JOHN F. HASLAM, citizens of the United States, residing at Brockton, in the county of Plymouth and State of Massachusetts, have invented certain new and useful Improvements in Lawn-Sprinklers; and we do hereby declare the following to be a full, clear, and exact description of the invention, such as will enable others skilled in the art to which it appertains to make and use the same.

The present invention relates to lawn-sprinklers.

One object of the present invention is to provide a lawn-sprinkler that shall throw the same amount of water per unit area on all parts of the surrounding lawn within a given radius.

Another object of the present invention is to make a lawn-sprinkler having a deflector against which a stream of water is projected and which is easily removable to allow sprinkling by hand.

To the above end the present invention consists in the lawn-sprinkler hereinafter described and claimed.

In the illustrated embodiment of our invention, Figure 1 is a side elevation of our improved sprinkler with hose detached and the supporting-standard broken off. Fig. 2 is a side elevation of the deflector, its support being shown in cross-section. Fig. 3 is a sectional view on line 3 3, Fig. 2; and Fig. 4 is a sectional view on line 4 4, Fig. 2.

In the drawings, 1 represents the hose-nozzle, which may be of any suitable type, conveniently that shown. Slidingly mounted upon the nozzle is the sleeve 2, formed of a thin strip of sheet metal, the ends thereof being secured between the sides 5 of the slotted block 6 by means of the screws 7. In a similar manner is formed the circular aperture 8, the slot in block 6 being of sufficient width to receive these ends, as shown in Fig. 3. The slot in block 6 extends above the ends of the metal strips secured therein and, as shown in Fig. 2, throughout the entire length of a portion of said block, forming a socket 9, comprising two parts substantially at right angles to each other. The deflector 10 is supported above the orifice in the nozzle by the shank 11, terminating in the foot 12, adapted to enter the socket 9. The surface of our deflector is of novel shape, so far as we know, the prior art being circular and slightly convex, substantially as shown in the drawings, and mounted opposite the nozzle-opening perpendicular to the direction of the stream of water emerging therefrom. This form of deflector will deflect a solid stream of water projected thereon, so that all portions of the area sprinkled will receive the same amount of water. This is a great desideratum and, so far as we know, has never before been attained in this class of sprinklers.

In order that the shank 11 of the deflector may not interfere with the even distribution of water over the surrounding lawn, we have made it wedge shape, substantially as shown in Fig. 4, with the apex toward the nozzle. Not only does thus a minimum amount of water impinge upon this shank, but such water adheres to the shank and on leaving it closes together behind it, so that there is no part of the lawn unsprinkled. It will be noted in this connection that by means of the sliding sleeve 2 the distance of the deflector 10 from the orifice of the nozzle may be regulated to meet the varying conditions of water-pressure and area to be sprinkled.

The nozzle and deflector are supported in a vertical position by means of a standard 13, provided with a pin 14, secured in its upper end, which is adapted to enter the hole 8, as shown in Fig. 1. The standard 13 is itself held in a vertical position in any suitable manner, conveniently by being forced a short distance into the ground, and its lower end may be provided with a similar pin for the purpose. In this position it not only supports the nozzle and deflector so that the water may be projected uniformly over a large area, but it also locks the foot 12 on the shank of the deflector in its socket, and thus prevents any improper positioning or accidental displacement of the deflector.

If it be desired to remove the deflector, it is only necessary to lift the nozzle from the pin 14 of the standard 13, when the deflector may be easily removed from its socket in the slotted block.

Having thus described our invention, we claim as new and desire to secure by Letters Patent of the United States—

1. A lawn-sprinkler, having, in combination, a nozzle, a removable deflector, a support therefor, a detachable standard provided with a pin rigidly secured thereto arranged to enter a recess in said support and lock said deflector in position, substantially as described.

2. A lawn-sprinkler, having, in combination, a nozzle, a removable deflector provided with a foot, a support having a socket to receive said foot, an aperture in said support angularly disposed to said socket, a detachable standard for said nozzle to enter said aperture and to lock the foot of the deflector in its socket, substantially as described.

3. A lawn-sprinkler, having, in combination, a nozzle, a removable deflector provided with a foot, a sliding sleeve upon said nozzle having a socket to receive said foot, an aperture in said sleeve substantially at right angles to said socket, a supporting-standard for said nozzle provided with a pin arranged to enter said aperture and lock the foot of the deflector in its socket, substantially as described.

4. A lawn-sprinkler, having, in combination, a nozzle, a deflector having a slightly-convex face, and a support for said deflector wedge-shaped in cross-section with the apex toward the nozzle, substantially as described.

5. A lawn-sprinkler, having, in combination, a nozzle, a removable deflector provided with a foot, a support having a socket to receive said foot, an aperture in said support angularly disposed to said socket, a removable pin for said nozzle to enter said aperture and to lock the foot of the deflector in its socket, substantially as described.

In testimony whereof we affix our signatures in presence of two witnesses.

AUGUSTUS G. W. PETERSON.
JOHN F. HASLAM.

Witnesses:
ALFRED H. HILDRETH,
WILLIAM A. SARGENT.